Dec. 5, 1933.  E. SCHULZE  1,938,048
MECHANISM FOR THE CONTINUOUS PRODUCTION OF SLABS OF EDIBLE FATS AND THE LIKE
Filed July 18, 1932  2 Sheets-Sheet 1
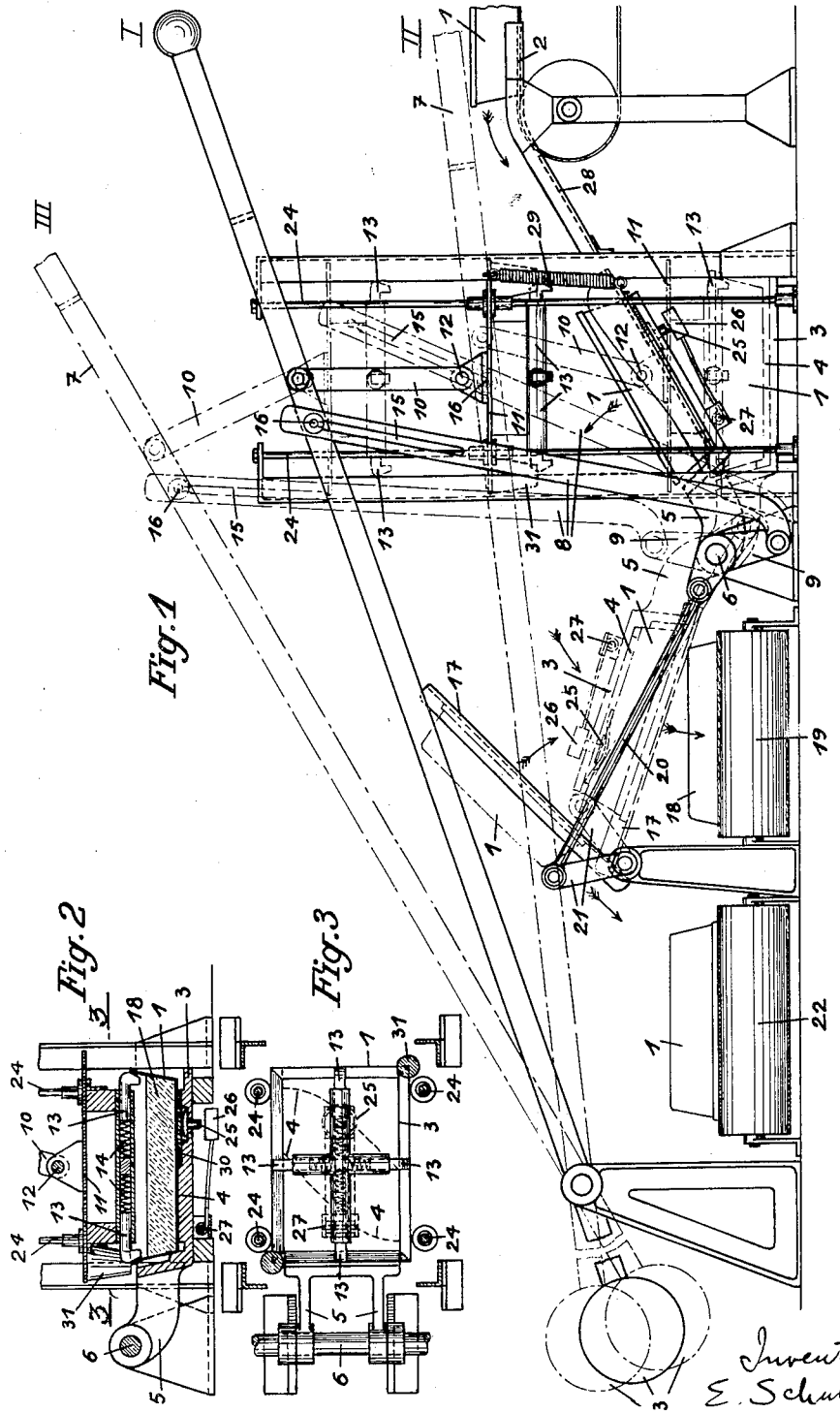

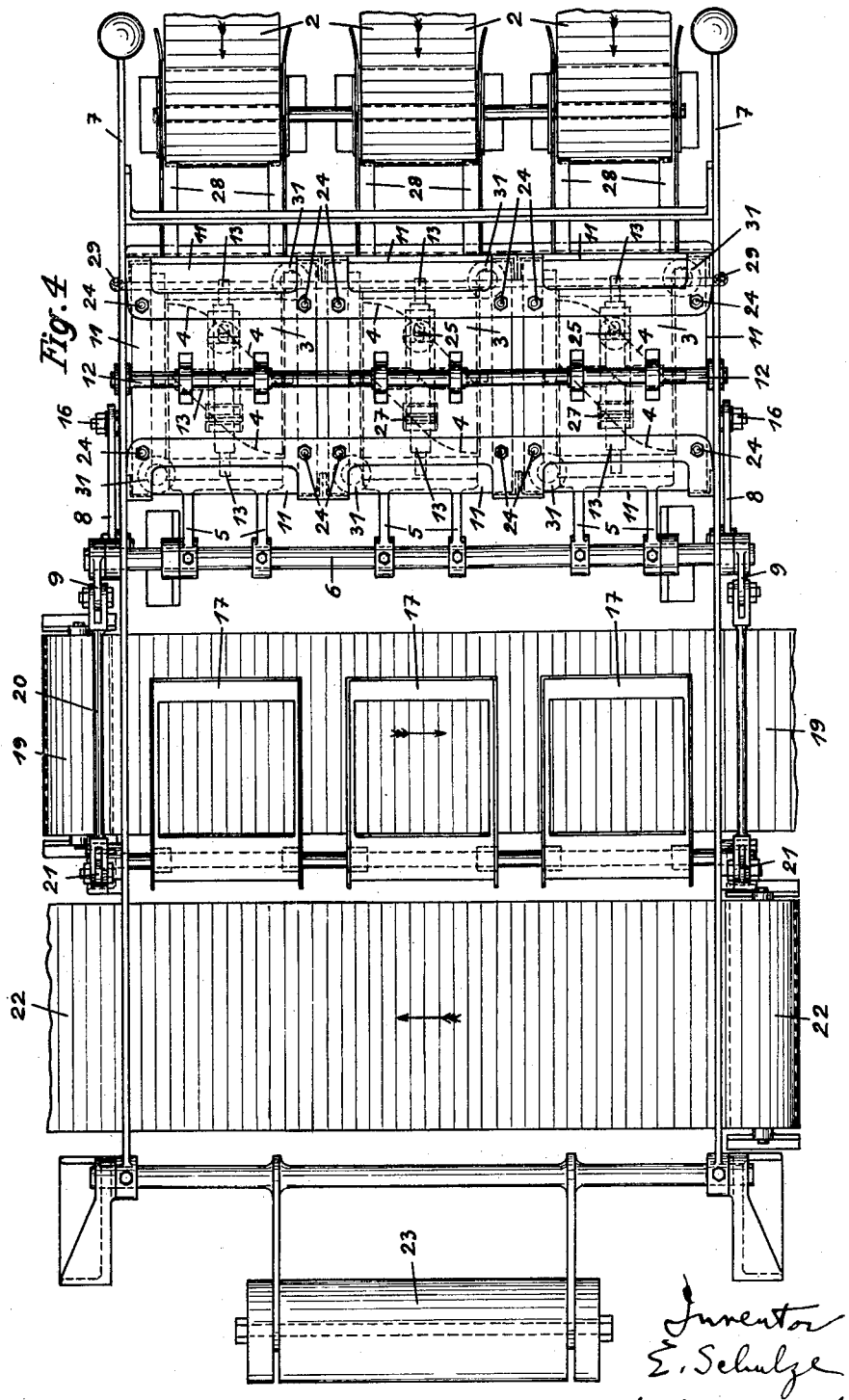

Patented Dec. 5, 1933

1,938,048

UNITED STATES PATENT OFFICE 1,938,048

MECHANISM FOR THE CONTINUOUS PRODUCTION OF SLABS OF EDIBLE FATS AND THE LIKE

Ernst Schulze, Harburg-Wilhelmsburg, Germany

Application July 18, 1932, Serial No. 623,303, and in Germany December 5, 1931

3 Claims. (Cl. 31—42)

My invention deals with a mechanism for the continuous production of slabs of edible fat and the like. These slabs are produced by pouring molten fat into metal molds and then cooling, whereupon the slabs are then removed by bending and rapping the molds. This method involves a large amount of work, a large number of the slabs are broken and the molds lose shape owing to the bending and knocking to which they are subjected.

The object of my invention is to loosen the slabs from the walls of the molds, to remove the slabs from the molds and to bring them to a wrapping mechanism, in such a manner that the molds and slabs of fat are not damaged and are not touched by hand during the complete process.

These objects are attained by feeding the molds after leaving the cooling device to base plates adapted to be inverted by means of levers, each base plate being provided with an elevated portion and cooperating with a plunger the underside of which is fitted with a spring operated, outwardly expanding cross member which when lowered causes the bottom of the mold containing the slab of fat to be bent and its sides to be forced apart.

An embodiment of my invention is shown by way of example in the accompanying drawings.

Fig. 1 represents an elevation of the device,
Fig. 2 is a part view of Fig. 1, partly in section,
Fig. 3 represents a section of Fig. 2 on the line 3—3,
Fig. 4 is a plan view of the device.

The mold 1, containing the slab of edible fat 18 which adheres to the walls, is brought out of the cooling device by means of the conveyor belt 2 of the mechanism and slides along the inclined surface 28 on to a base plate 3 which is maintained in a suitable position by means of the spiral springs 29. The base plate 3 is provided with an elevated portion 4 extending obliquely from one side to the other and is adapted to be inverted by means of the lever 5 which is rotatably pivoted to the shaft 6. The inversion of the base plate 3 is accomplished by the lever 7 which is provided with a counterweight 23 and connected to the base plate by means of levers 8 and 9. The lever 7 is fitted with an additional pivoted lever 10 on the opposite end of which is fitted a plunger 11 pivoted on the shaft 12 and guided by the four columns 24. The underside of the plunger 11 is provided with a spring operated, outwardly expanding cross member 13 comprising four hooked and bevelled bolts slidable in tubes and urged outwardly by the spiral springs 14 and with two diagonally opposing buffers 31. The bevelled ends of the cross member 13 fit into the upper open side of the mold and force the sides thereof apart when the plunger 11 presses the cross member 13 and the buffer 31 against it, thus causing the slab of fat 18 to be loosened from the sides of the mold. At the same time the base plate 3 is brought into its lowest position under the action of the spiral springs 29 and the bottom of the mold 1 is pressed against the base plate 3 and its elevated portion 4 so that it is bent accordingly, thus loosening the slab of fat 18 from the bottom also.

The lever 8 has slots 15 in which the lever 7 is guided by means of the bolts 16. Due to the provision of the slots 15 it is possible to bring the lever 7 from position I into position II in which position the mold 1 is pressed against the base plate 3 and its elevated portion 4 and the cross member 13 inserted into the open side of the mold 1, causing the slab of fat to be loosened from the mold. After this operation the lever 7 is restored from position II into position I, while the plunger 11 rises upwardly to a position removed from the mold. The lever 7 operating the plunger is then brought into position III which causes the base plate 3 to be inverted by means of the levers 8 and 9, thus causing the mold 1 containing the now loose slab of fat 16 to be also inverted. In positions I and III the bolts 16 are maintained in the topmost position of the slot 15 by means of a leaf spring sufficiently powerful to keep the bolt in place whilst the lever 7 is moved from position III to position I so that the base plate 3 reverts back to its original position without causing the bolt 16 to slide out of its topmost position. This sliding does not commence until just after the lever 7 has moved from position I, preparatory to attaining its position II, since at this moment the resistance of the lever 8 to further downward movement overcomes the resistance of the spring.

Prior to the reversal of the base plate 3 the open frame 17 is lowered by means of the levers 20 and 21 so that the mold after having been inverted is placed on it upside down. The slab of fat 18 drops through the frame 17 on to the conveyor belt 19 which carries it to a wrapping mechanism. On the return of the base plate 3, the frame is raised by means of the levers 20 and 21 to such a height that the mold 1 slides off it and is carried away by the conveyor belt 22. The device for bending the bottom and forcing apart the sides of the mold is generally sufficient to loosen the slab of fat. In order, however, to effect a reliable loosening of the slab of fat from the mold, an automatic knocking device may also be provided. This knocking device comprises a large headed pin having its shank 25 guided in an opening in the base plate 3 and a hammer 26 pivotally fixed for example by means of a flat spring to the outer surface of the base plate and so supported in the bearing 27 that it cannot drop down when the hammer is located beneath the base plate. The hammer 26 strikes the pin 25 and knocks it against the mold 1 when the base plate swings over. Due to the flexibility of the flat spring, the hammer 26 vibrates and sets up a continuous knocking on the mold. To protect the mold from damage a protective layer 30 of rubber or the like is fitted between the base plate 3 and the mold 1. The base plate 3 may be provided with a plurality of knocking devices of this type which in ordinary circumstances are sufficient to loosen the slab of fat from the mold so that the plunger 11 may be dispensed with.

This mechanism may also be so constructed that it is adapted to loosen the slabs of fat from one or several say for example 3, 6, 12 molds placed adjacent to each other. The device can also be operated by mechanical means in the same manner as that shown and described for manual operation.

I claim:—

1. A device adapted to continuously remove slabs of fat from molds comprising means for continuously feeding molds containing fat to said device, a base plate adapted to support said molds, said base plate having an elevated portion contacting with the bottom portion of said mold during the removal of slabs of fat therefrom, and a plunger having an outwardly expanding member adapted to be inserted in the upper opening of said molds to contact the inner wall surfaces at the upper portion of said molds in operative position so as to force them outwardly, and said plunger also exerting a downward thrust on said wall surfaces thereby cooperating with the aforementioned elevated portion on the base plate to bend the bottom portion of said molds.

2. A device adapted to continuously remove slabs of fat from molds comprising means for continuously feeding molds containing fat to said device, a base plate adapted to support said molds, said base plate having an elevated portion contacting with the bottom portion of said molds during the removal of slabs of fat therefrom, a plunger having an outwardly expanding member adapted to be inserted in the upper opening of said molds to contact the inner wall surfaces at the upper portion of said molds in operative position so as to force them outwardly, the said plunger also exerting a downward thrust on said wall surfaces thereby cooperating with the aforementioned elevation on the base plate to bend the bottom of said molds, a pin positioned at the bottom of said molds and a flat spring hammer adapted to impart a series of blows against said pin to assist in the removal of slabs of fat therefrom.

3. A device adapted to continuously remove slabs of fat from molds comprising means for continuously feeding molds containing fat to said device, a base plate adapted to support said molds, said base plate having an elevated portion contacting with the bottom portion of said molds during the removal of slabs of fat therefrom, a plunger having an outwardly expanding member adapted to be inserted in the upper opening of said molds to contact the inner wall surfaces at the upper portion of said molds in operative position so as to force them outwardly, the said plunger also exerting a downward thrust on said wall surfaces thereby cooperating with the aforementioned elevation on the base plate to bend the bottom of said molds, means for turning the said molds bottom side up and means for continuously removing slabs of fat from said molds.

ERNST SCHULZE.